United States Patent [19]
Nagai

[11] Patent Number: 5,002,242
[45] Date of Patent: Mar. 26, 1991

[54] INDUSTRIAL ROBOT

[75] Inventor: Masahide Nagai, Tokyo, Japan

[73] Assignee: Seiko Instruments Inc., Japan

[21] Appl. No.: 355,550

[22] Filed: May 23, 1989

[30] Foreign Application Priority Data

May 23, 1988 [JP] Japan .............................. 63-67759[U]

[51] Int. Cl.$^5$ ............................................... F16L 3/00
[52] U.S. Cl. ..................................... 248/49; 414/918; 901/50
[58] Field of Search ........................... 248/49, 51, 52; 414/918; 901/50; 59/78.1; 307/147; 191/12 R; 187/9 E

[56] References Cited

U.S. PATENT DOCUMENTS

| 3,779,003 | 12/1973 | Boissevain | 59/78.1 |
| 3,942,031 | 3/1976 | Bahder | 307/147 |
| 3,959,608 | 5/1976 | Finlayson | 191/12 R |
| 3,968,859 | 7/1976 | Ehrhardt | 187/9 E |
| 4,266,744 | 5/1981 | Bergman | 248/49 |
| 4,582,281 | 4/1986 | Van Camp | 248/51 |
| 4,715,077 | 12/1987 | Shepheard | 248/49 X |

FOREIGN PATENT DOCUMENTS

| 129679 | 7/1984 | Japan | 901/50 |
| 288545 | 3/1964 | Netherlands | 248/49 |

Primary Examiner—J. Franklin Foss
Attorney, Agent, or Firm—Bruce L. Adams; Van C. Wilks

[57] ABSTRACT

An industrial robot having an expansion axis, a turning axis and a vertical axis, wherein the one end of flexible supporting plate supporting an internal wiring and piping system of the robot is fixed to the expansion axis which is capable of making free linear motion for a base plate arranged to the vertical axis. The flexible supporting plate is bent in the form of letter U in parallel to the turning plane of the expansion axis. Therefore, the expansion axis can be located at the sufficient lower position for the base plate, and the strength and accuracy of the drive mechanism can be improved.

12 Claims, 3 Drawing Sheets

INDUSTRIAL ROBOT

BACKGROUND OF THE INVENTION

1. Field of the Invention

The present invention relates to an internal wiring and piping system of a robot for industrial use providing the linear motion mechanism and turning motion mechanism.

2. Description of the Prior Art

In relation to the internal wiring and piping system of the robot for industrial use having a vertical axis, turning axis and expansion axis, the prior art has employed the system explained hereunder.

FIG. 4 and FIG. 5 are illustrations for explaining the structure of the prior art.

In FIG. 4, the reference numeral 1 designates an R axis base plate; an R axis housing 2 is fixed to the R axis base plate 1; rollers 3 are rotatably provided at the positions forming the angle of 120 degrees at the both sides of front and rear sides of R axis housing 2. Two sets of three rollers 3 are respectively provided at the front and rear sections of housing 2. The reference numeral 4 designates extensible R axis pipe provided as the expansion axis supported by six rollers 3; rack 5 is fixed to the R axis pipe 4; rotation stopper block 6 which has two pieces of rotatable rollers, not illustrated, is supporting the right and left sides of rack 5, at the lower section thereof and is fixed to the R axis housing 2; R axis motor plate 7 is fixed to the R axis housing 2; R axis motor 8 is fixed to the R axis motor plate 7; small gear 9 is fixed to the output axis of R axis motor 8; large gear 10 is engaging with small gear 9, rotation of this large gear moves the R axis pipe 4 in its axial direction through rotation of the pinion provided in the R axis housing 2 and engaged with the rack 5; moving end clamp angle 17 is fixed to the R axis pipe 4; belt-shaped thin plate 12 is fixed to the moving end clamp angle 17 and bending lower side of base plate 1 for the R axis pipe 4; cutout part 13 is provided for binding the wirings and pipings along the thin plate 12 with a string type member at several points; and fixing end clamp angle 18 is provided for fixing the fixing end of thin plate 12.

The R axis operates as follows. When the R axis motor 8 revolves, the small gear 9 fixed to the output axis of motor rotates, causing the large gear 10 engaging therewith and pinion gear to rotate. Moreover the rack 5 engaging therewith and the R axis pipe 4 make the extending operation. Thereby, the moving end of the thin plate 12 fixed to the R axis pipe 4 through the moving end clamp angle 17 is also caused to make the extending operation. In this case, since the belt shaped thin plate 12 is bent in the vertical directions, it can be seen from the upper side, that the thin plate 12 lies on the center line of R axis pipe 4 in such entire range from the moving end to the fixing end. Meanwhile, the curvature of thin plate 12 supporting wirings and pipings must be set sufficiently large considering the life expectancy of such wirings and pipings, but the distance in the vertical direction between the moving end and fixing end becomes longer in the vertical direction as much as such consideration. Therefore, the R axis pipe 4, of which the moving end is fixed through the moving end clamp angle 17, is located higher for the base plate 1, of which the fixing end is fixed through the fixing end clamp angle 18, degrading the accuracy.

FIG. 5 illustrates a structure of the turning axis of the prior art. In this figure, 51 designates the T axis frame; T axis motor plate 52 is fixed to the T axis frame 51; T axis motor 53 is fixed to the T axis motor plate 52; small pulley 54 is fixed to the output axis of the T axis motor 53; large pulley 55, having a rotatable worm gear not illustrated within the T axis frame 51, is engaged with small pulley 54 through a belt; T axis bracket 56 is fixed to a rotatable wheel gear, not illustrated, engaging with the worm gear and provided within the T axis frame 51; T axis dog 57 which is fixed to the T axis bracket 56, transmits rotation of the T axis to base plate 1 and guides the vertical motion of base plate 1; upper cutout section 58 is provided for keeping free the R axis pipe 4 making the linear motion and the belt shaped thin plate 12 bending in the vertical direction; and two pieces of rotatable rollers 59 which are fixed to the R axis base plate 1, transmit a driving force of the turning axis to the expansion axis from the T axis dog 57. The T axis may be operated as follows. First, when the T axis motor 53 revolves, the small pulley 54 fixed to the output axis of this motor rotates, causing the large pulley 55 and worm gear engaging therewith through the belt to rotate, followed by the turning operation of the wheel gear, T axis bracket 56 and T axis dog 57 being engaged with such pulley and worm gear. Thereby, the entire part of the R axis including the R axis base plate 1 is also caused to make a turning operation through two pieces of roller 59 fixed to the R axis base plate 1. On the other hand, the R axis as a whole is caused also to make a vertical motion with the vertical axis (hereinafter referred to as the Z axis) 60 which is in the vertical motion by a driving mechanism not illustrated. Accordingly, the R axis base plate 1 makes the vertical motion. However, since the T axis as a whole including the T axis dog does not make the vertical motion, a driving force of the turning axis transmitted from the T axis dog 57 is sent to the expansion axis by the two pieces of rotatable rollers 59 fixed to the R axis base plate 1. In addition, the T axis bracket 56 is closest to the R axis base plate 1 at the position where the Z axis becomes lowest. In this timing, the T axis dog 57 enters the R axis at the relatively deepest position and the cutout section 58 is provided at the upper part in order to avoid collision with the R axis pipe 4. In the method of the prior art, the belt shaped thin plate 12 is bent in the vertical direction and the fixing end is in such a height of the R axis base plate 1 just under the R axis pipe 4. Therefore, the vertical size of upper cutout section 58 becomes long. Therefore, when the base plate 1 is located at the upper end of T axis dog 57, the strength of two pole sections of the T axis dog becomes weak in the turning direction.

As described, the apparatus of the prior art has the following pair of problems resulting from the positional relationship of the moving end and fixing end of the thin plate 12. First, the strength of the drive mechanism is insufficient. Namely, in the shape of mechanism part for transmitting a driving force of the turning axis to the expansion axis, the cutout part provided for making free the pipe which makes linear motion and the belt shaped thin plate bending in the form of a letter U in the vertical direction becomes long also in the vertical direction and thereby when the driving force of the turning axis is to be transmitted to the expansion axis with the upper end, namely the vertical axis is located at the upper end, the strength becomes insufficient. It becomes more apparent when the speed of the turning axis becomes higher, the stroke of the vertical axis becomes longer or the weight to be carried becomes heavier. Second, the height of the robot becomes high. Namely, since the curvature of thin plate supporting wirings and pipings must be large considering the life expectancy of such wiring and pipings, the vertical distance between the moving end and fixing end becomes much longer. Therefore, the fixed pipe of the moving end becomes higher than the base plate fixed at the fixing end through the angle, resulting in degradation of accuracy. It becomes more apparent when the size of the robot becomes smaller. Moveover, the strength of the drive mechanism becomes more insufficient as much as considering life expectancy.

SUMMARY OF THE INVENTION

It is an object of the present invention to provide an improved wiring and piping system of an industrial robot in which the drive mechanism has sufficient strength and accuracy. The improved wiring and piping system employed in the present invention provides the wirings and pipings from the one end of the pipe which makes the linear motion,, namely from the hand fitting side. The moving end of the belt shaped thin plate is attached to the other end of the pipe, it is then bent to the left or right of the pipe and the wirings and pipings are bound at several points with a string like material along such thin plate for the purpose of support. Moreover, the fixing end of belt shaped thin plate, wiring and piping are fixed to the angle fixed to the base plate, which does not make the linear motion, at the lower side of the pipe. With the method described above, the wiring and piping can be supported almost continuously by the pipe and thin plate at the area from the hand fitting side of the pipe which makes the linear motion to the base plate, which does not make the linear motion, at the lower side of the pipe. Meanwhile, the two sheets of thin plates may also be used in the following manner. First, the wiring and piping are laid from the one end of the pipe which makes linear motion, namely from the hand fitting side thereof. Thereafter, the moving ends of two sheets of belt shaped thin plates having the same repulsion force are fitted to the other end of the pipe, one is bent to the left side of the pipe while the other is bent in the right side, and the wiring and piping are separated along these two sheets of thin plates and then bound at several points with string like material for the purpose of support. Moveover, the fixing end of the belt shaped thin plate, wiring and piping are fixed to the angle being fixed to the base plate, which does not make linear motion, at the lower side of pipe. With such a method, wiring and piping can be supported almost continuously with the pipe and thin plate during the area between the hand fitting side of pipe which makes linear motion to the base plate, which does not make linear motion, at the lower side of pipe.

The system of the present invention can solve such a pair of problems described resulting from positional relationship between the moving end and fixing end. First, the drive mechanism has sufficient strength. Namely, since the upper cutout section, provided for making free pipe which makes the linear motion and one or two sheets of belt shaped thin plate being bent in the form of the letter U in the horizontal direction, can be shortened in the vertical direction in the shape of a mechanism element to transmit the driving force of the turning axis to the expansion axis, in case a driving force of the turning axis is transmitted at the upper end, namely when the vertical axis is located at the upper end, strength becomes sufficient. Moreover, in case a sheet of thin plate is used, the curvature is always kept constant anywhere the expansion axis is provided by fitting the angle to the moving end backward. In case two sheets of thin plates are used, these sheets bending in the horizontal direction are balanced because of almost similar repulsion force and the curvature becomes almost equal. In addition, this curvature is constant even anywhere the expansion axis is located. Accordingly, in any case, since the two sheets of thin plates are located on the center line of the pipe, when viewed from the upper side, within the region between the moving end and the point bending in the horizontal direction, such sheets pass almost at the center of the upper cutout section of the mechanism element. Second, the accuracy of the robot can be sufficiently improved. Namely, the curvature of thin plate supporting the wiring and piping must be set large considering the life expectancy of these, but the distance between the moving end and fixing end becomes longer in the horizontal direction as much as considering the life expectancy. However, the distance is not related to the vertical direction. Accordingly, the pipe of which the moving end is fixed is located, through the angle, at the sufficiently lower position for the base plate fixed at the fixing end and thereby accuracy can be improved.

DETAILED DESCRIPTION OF THE PREFERRED EMBODIMENTS

An embodiment of the present invention is explained with reference to the accompanying drawings.

Figure 1:
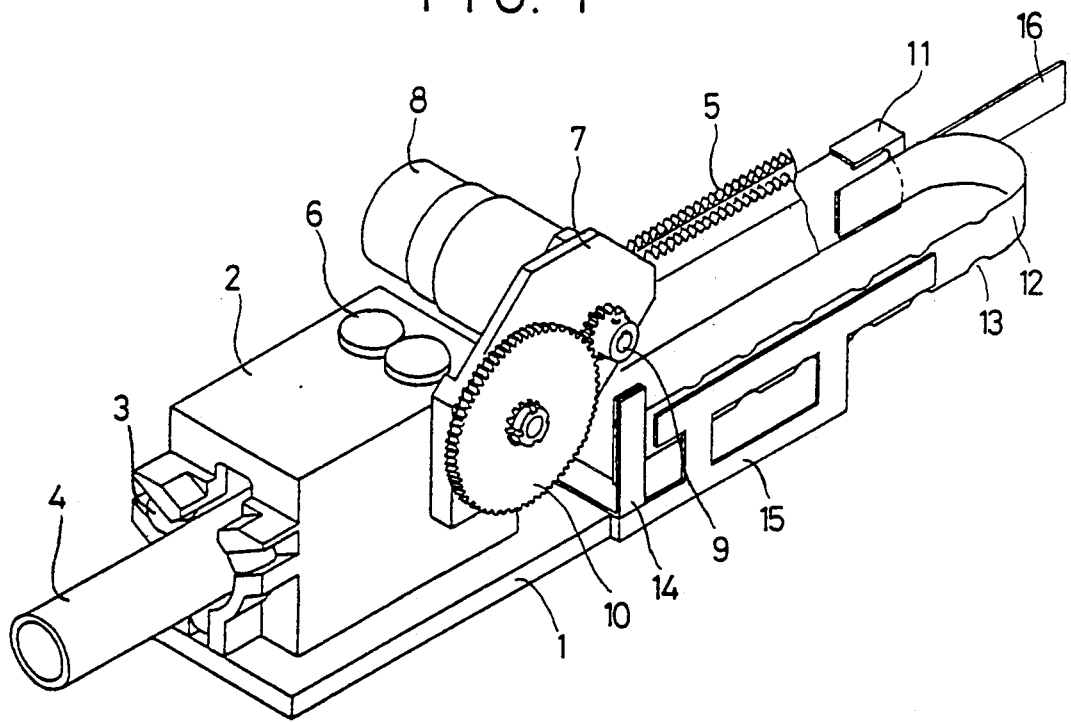
FIG. 1 illustrates the structure of the expansion axis (only a sheet of thin plate is used) in the first embodiment of the present invention.

FIG. 1 is a structure (sheet of thin plate is used) of an expansion axis (hereinafter referred to as R axis) of an embodiment of the apparatus of the present invention. The reference numeral 1 designates the R axis base plate; R axis housing 2 is fixed to the R axis base plate 1; rotatable six rollers 3 formed an angle of 120 degrees around six shafts, not illustrated, are fixed to the front and rear sections of R axis housing 2; expandable R axis pipe 4 is supported by six rollers 3; rack 5 is fixed to the R axis pipe 4; rotation stopper block 6 which has, at the lower part thereof, a pair of rotatable rollers, not illustrated, to support the right and left sides of rack 5, is fixed to the R axis housing 2; R axis motor plate 7 is fixed to the R axis housing 2; R axis motor 8 is fixed to R axis motor plate 7; small gear 9 is fixed to the output axis of R axis motor 8; large gear 10 which has the rotatable pinion gear, not illustrated, engaging with the rack 5 within the R axis housing 2, is engaged with small gear 9; moving end clamp angle 11 is fixed to the R axis pipe 4; belt shaped thin plate 12 is fixed to the moving end clamp angle 11 and bent in the horizontal direction; cutout section 13 is provided for binding the wiring and piping along the thin plate 12 with a string like material at several points; fixing end clamp angle 14 is provided for fixing the fixing end of thin plate 12 thin plate support angle 15 is fixed to the R axis base plate 1 and keeps constant the curvature of thin plate 12; thin plate support angle 16 is fixed to the moving end clamp angle 11 and keeps constant the curvature of thin plate 12. The R axis can be operated as explained hereunder. First, when the R axis motor 8 revolves, the small gear 9 fixed to the output axis of motor rotates and thereby the large gear 10 and pinion gear engaging thereto also rotate, followed by an expanding operation of the rack 5 and R axis pipe 4 engaging therewith. Thereby, the moving end of thin plate 12 fixed to the R axis pipe 4 is also caused to make the expanding operation through the moving end clamping angle 11. In this case, the curvature of belt shaped thin plate 12 bending in the horizontal direction does not change even anywhere in the stroke where the expansion axis is located because the thin plate support angle 16 in the moving side and the thin plate support angle 15 in the fixing side are in the almost parallel positional relationship. Accordingly, the belt shaped thin plate 12 is located on the center line of R axis pipe 4, when viewed from the upper side, in the region from the moving end to the point bending in the horizontal direction. Meanwhile, the curvature of thin plate 12 supporting wiring and piping must be set large considering the life expectancy of them, but the distance between the moving end and fixing end becomes longer in the horizontal direction as much as such consideration but is not related to the vertical direction. Accordingly, the R axis pipe 4 fixing the moving end through the moving end clamp angle 11 is located sufficiently lower for the base plate 1 fixing the fixing end through the fixing end clamp angle 14 and the accuracy can be improved.

Figure 2:
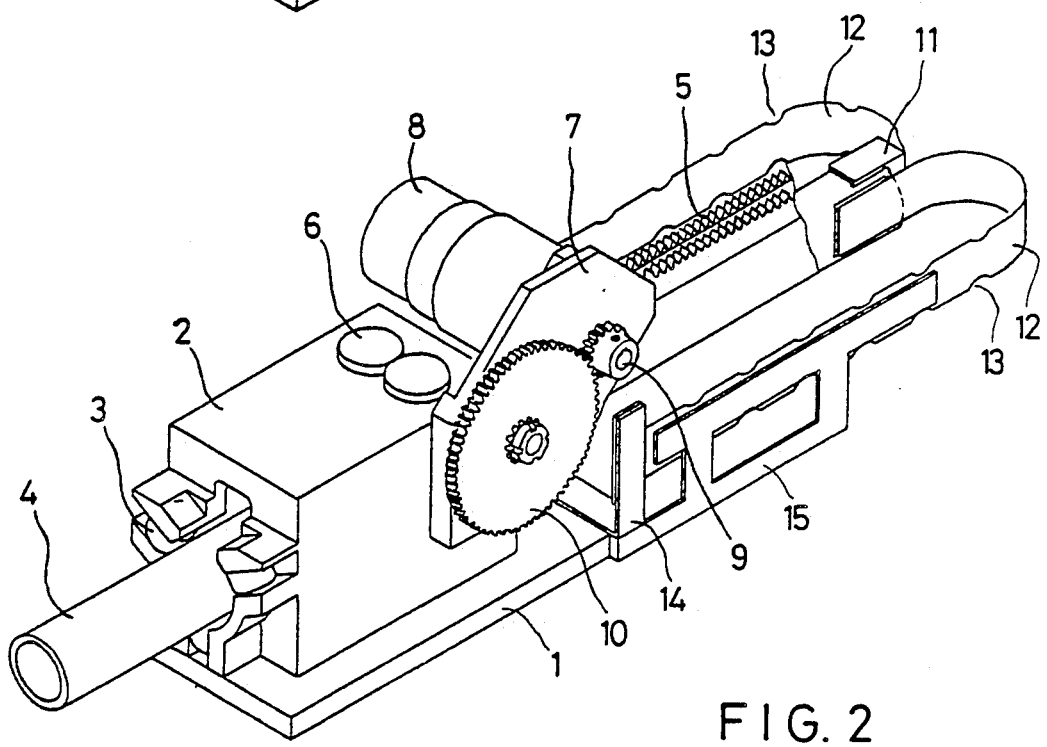
FIG. 2 illustrates the structure of the expansion axis (two sheets of thin plates are used) in the second embodiment.

FIG. 2 is a perspective view for explaining another embodiment, wherein two sheets of thin plates 12, 12 are provided to the moving end clamp angle 11 fixed to the end section of R axis pipe 4. With the expansion of the R axis, the moving ends of two sheets of thin plate 12 fixed to the R axis pipe 4 through the moving end clamp angle 11 are also caused to make the expanding operation. In this case, two sheets of belt shaped thin plates 12 bending in the horizontal direction respectively are balanced because these have the equal repulsion force and thereby the curvature of respective thin plates becomes almost equal. In addition, this curvature does not change even anywhere where the expansion axis is located. Therefore, the two sheets of thin plates 12 are located, when viewed from the upper side, on the center line of the R axis pipe 4 in the region from the moving end to the point bending in the horizontal direction.

Figure 3:
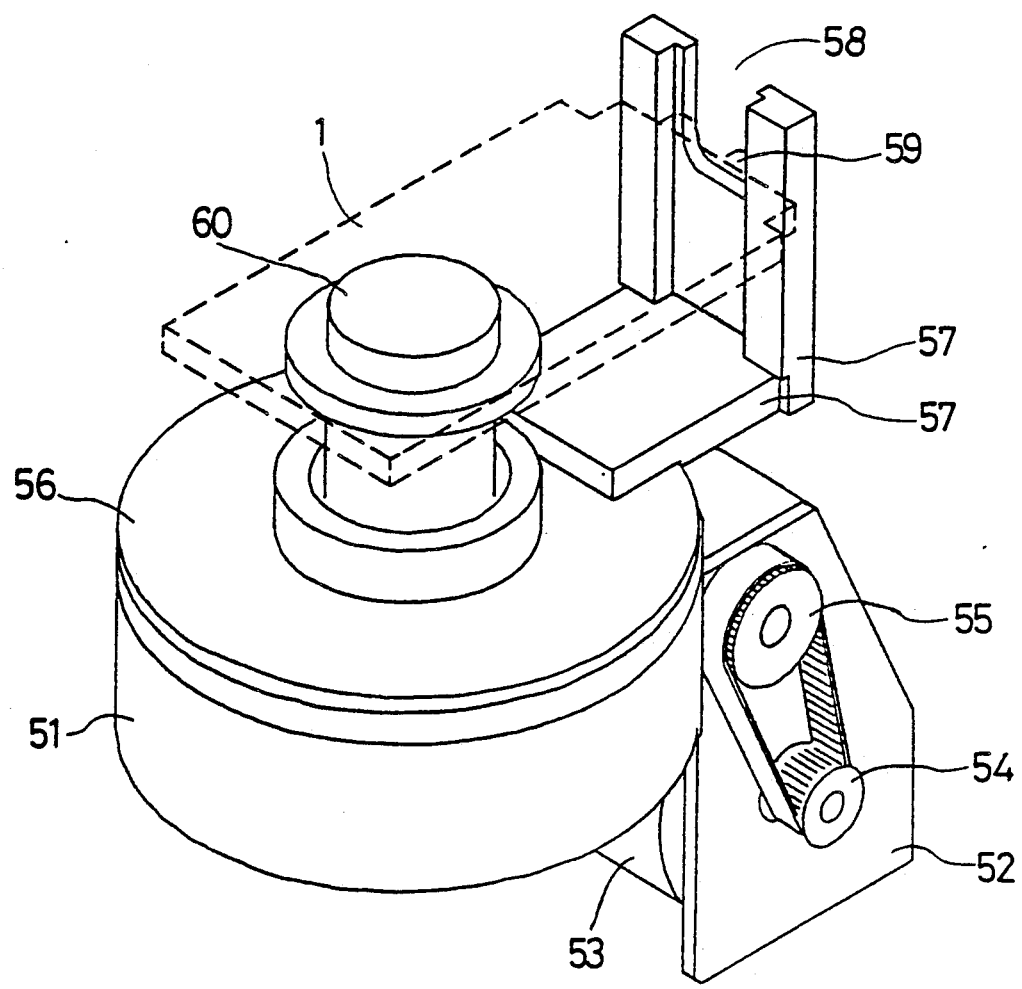
FIG. 3 illustrates the structure of the turning axis in the first and the second embodiments.
Figure 4:
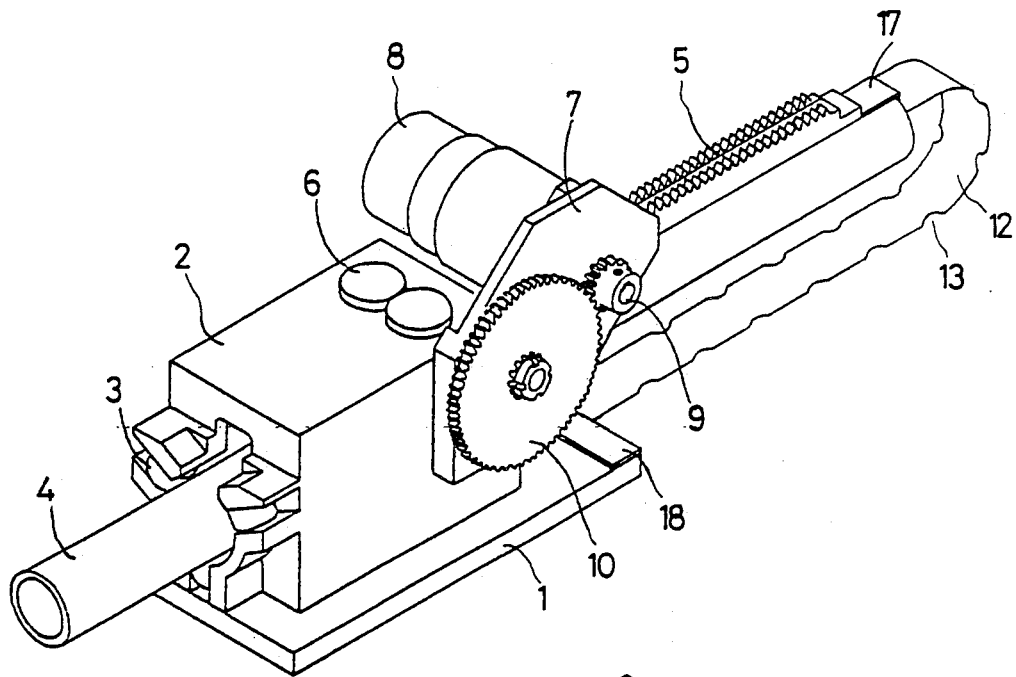
FIG. 4 illustrates the structure of the expansion axis in the prior art.
Figure 5:
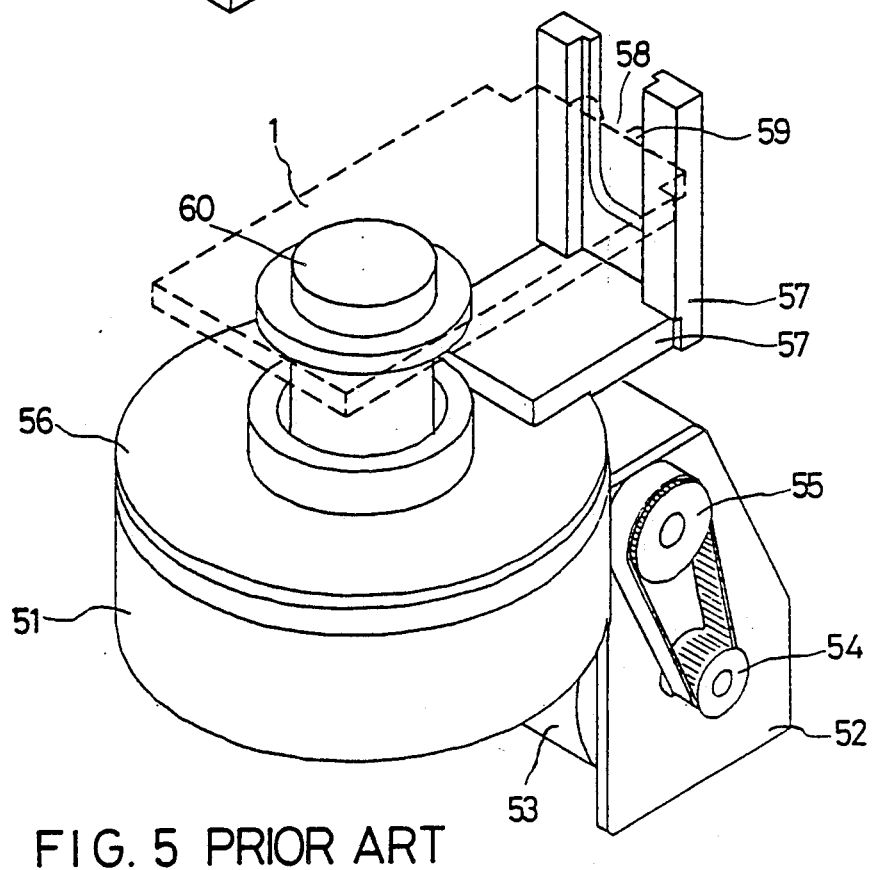
FIG. 5 illustrates the structure of the turning axis in the prior art.

FIG. 3 is a structure of the turning axis (hereinafter referred to as the T axis) of both embodiments of the present invention. In FIG. 3, the reference numeral 51 designates the T axis frame; T axis motor plate 52 is fixed to the T axis frame 51; T axis motor 53 is fixed to the T axis motor plate 52; small pulley 54 is fixed to the output axis of T axis motor 53; large pulley 55 which has a rotatable worm gear, not illustrated, within the T axis frame 51, is engaged with a small pulley 54 through the belt; T axis bracket 56 which has a rotatable wheel gear, not illustrated, which engages with the worm gear within the T axis frame 51, is fixed to the T axis frame 51; T axis dog 57 is fixed to the T axis bracket 56; upper cutout section 58 is provided for keeping free the R axis pipe 4 which makes the linear motion and the belt shaped thin plate 12 bending in the horizontal direction;

two pieces of rotatable rollers 59 are fixed to the R axis base plate 1 and transmit a driving force of the turning axis sent from the T axis dog 57 to the expansion axis. The T axis can be operated as follows. First, when the T axis motor 53 revolves, the small pulley 54 fixed to the output axis of this motor rotates. Thereby, the large pulley 55 and worm gear engaging with such small pulley through the belt also rotate, followed by turning of the wheel gear, T axis bracket 56 and T axis dog 57 engaging therewith. Thereby, the R axis as a whole including the R axis base plate 1 is caused to make the turning operation through two pieces of rollers 59 fixed to the R axis base plate 1. Meanwhile, the R axis as a whole is caused to make vertical motion with the vertical axis (hereinafter referred to as the Z axis) 60 which is driven for vertical motion by the vertical operation mechanism not illustrated. Therefore, the R axis base plate 1 also makes vertical operation. However, since the T axis section including the T axis, dog 57 does not make vertical motion, a driving force of the turning axis transmitted from the T axis dog 57 is then transmitted to the expansion axis with two pieces of rotatable rollers fixed to the R axis base plate 1. Moreover, the T axis bracket 56 and R axis base plate 1 are in the closest positional relation when the Z axis is located at the lowest position. In this timing, the T axis dog 57 enters the R axis at the relatively deepest position and therefore the cutout section 58 is provided at the upper part in order to avoid collision with the R axis pipe 4. In the prior art structure, the belt shaped thin plate 12 is bending in the vertical direction and the fixing end is at the height of R axis base plate 1 just under the R axis pipe 4, but in the method of this invention, the belt shaped thin plate 12 is bending in the horizontal direction and the fixing end is at the height of R axis pipe 4 just beside the R axis pipe 4. Thereby the vertical size of upper cutout section 58 may be shortened and the T axis dog 57 now has sufficient strength in the turning direction.

As described, the means of the present invention provides sufficient strength of the drive mechanism of the turning axis, resulting in the advantages that the turning speed of the turning axis can be raised, or the stroke of the vertical axis can be expanded or the weight of the object to be carried can be set heavier. In addition, the height of the robot can be set lower sufficiently and thereby accuracy can be enhanced. In case a sheet of thin plate is used, since the thin plate support angle 16 fixed to the R axis pipe 4 is extruded backward while the expansion axis is compressed, the cover thereof becomes long in the backward direction. However, in case two sheets of thin plates are used, the thin plate support angle 16 is unnecessary and therefore the cover becomes shorter than that in the above case. Moreover, when two sheets of thin plates 12 are used, mutual sliding is not generated between thin plates and between the thin plate 12 and thin plate support angle 15 and therefore the elements are not worn out even after the expansion axis is operated for a long period.

What is claimed is:
1. An industrial robot comprising:
 means defining an expansion axis;
 means defining a turning axis;
 a base plate which supports the means defining said expansion axis and is mounted for movement around said turning axis to define a turning plane of the expansion axis;

wiring and piping means for flexibly coupling the means defining said expansion axis and a robot controller; and flexible supporting means for supporting said wiring and piping means, wherein said flexible supporting means is bent in the form of letter U disposed parallel to the turning plane of said expansion axis.

2. An industrial robot in accordance with claim 1, further comprising clamp means for fixing one end of said flexible supporting means to the means defining said expansion axis and another end to said base plate.

3. An industrial robot in accordance with claim 1, further comprising at least one thin plate support angle for keeping a constant bending curvature of said flexible supporting means.

4. An industrial robot in accordance with claim 1, wherein said flexible supporting means comprises a belt shaped thin plate.

5. An industrial robot, comprising:

means defining an expansion axis;

means mounting the means defining the expansion axis for turning movement around a turning axis in a turning plane; and flexible supporting means for supporting wiring from the means defining the expansion axis and comprising at least one flexible support bent in a U-shape, and means mounting the at least one flexible support with two legs thereof defining a plane parallel to the turning plane.

6. The industrial robot according to claim 1, wherein the flexible supporting means comprises two flexible supports bent in a U-shape, and means mounting both flexible supports to dispose the legs thereof in the plane parallel to the turning plane.

7. The industrial robot according to claim 5, further comprising means for maintaining a constant bending curvature of the at least one flexible support.

8. The industrial robot according to claim 7, wherein the means for maintaining the constant bending curvature comprises at least one thin plate support angle in contact with one leg of the at least one flexible support.

9. The industrial robot according to claim 6, further comprising means for maintaining a constant bending curvature of the two flexible supports.

10. The industrial robot according to claim 9, wherein the means for maintaining a constant bending curvature comprises two thin plate support angles in contact with one leg of each flexible support.

11. The industrial robot according to claim 5, wherein the at least one flexible support comprises a belt shaped thin plate.

12. The industrial robot according to claim 5, wherein the means mounting the means defining the expansion axis for turning movement comprises a base plate and wherein the means mounting the at least one flexible support comprises clamp means for fixing one end of the at least one flexible support to the base plate and another end of the at least one flexible support to the means defining the expansion axis.

* * * * *